United States Patent
Takeuchi et al.

(10) Patent No.: US 12,003,021 B2
(45) Date of Patent: Jun. 4, 2024

(54) ANTENNA SYSTEM

(71) Applicant: AGC Inc., Tokyo (JP)

(72) Inventors: Shoichi Takeuchi, Tokyo (JP); Hideaki Shoji, Tokyo (JP)

(73) Assignee: AGC INC., Tokyo (JP)

( * ) Notice: Subject to any disclaimer, the term of this patent is extended or adjusted under 35 U.S.C. 154(b) by 443 days.

(21) Appl. No.: 17/322,153

(22) Filed: May 17, 2021

(65) Prior Publication Data

US 2021/0273321 A1 Sep. 2, 2021

Related U.S. Application Data

(63) Continuation of application No. PCT/JP2019/045393, filed on Nov. 20, 2019.

(30) Foreign Application Priority Data

Nov. 22, 2018 (JP) .................. 2018-219406

(51) Int. Cl.
| | |
|---|---|
| *H01Q 1/32* | (2006.01) |
| *B32B 7/12* | (2006.01) |
| *B32B 17/10* | (2006.01) |

(52) U.S. Cl.
CPC .............. *H01Q 1/325* (2013.01); *B32B 7/12* (2013.01); *B32B 17/10165* (2013.01); *B32B 2457/00* (2013.01); *B32B 2605/00* (2013.01)

(58) Field of Classification Search
CPC .......... H01Q 1/27; H01Q 1/1271; H01Q 1/32; H01Q 1/325; H01Q 1/38; H01Q 1/422;

(Continued)

(56) References Cited

U.S. PATENT DOCUMENTS

| | | |
|---|---|---|
| 10,389,042 B2 | 8/2019 | Kim et al. |
| 2011/0027515 A1 | 2/2011 | Melcher et al. |

(Continued)

FOREIGN PATENT DOCUMENTS

| | | |
|---|---|---|
| GB | 2 271 139 A | 4/1994 |
| JP | H03-183202 A | 8/1991 |

(Continued)

OTHER PUBLICATIONS

Mizusawa et al., "Polarization Characteristics of Microwave through a Window Glass and Its Improvement by Matching Layers," Journal of the Institute of Electronics, Information and Communication Engineers, vol. J72 B-II, No. 9, Sep. 1989, pp. 502-504.

(Continued)

*Primary Examiner* — Jason M Crawford
(74) *Attorney, Agent, or Firm* — Foley & Lardner LLP

(57) ABSTRACT

An antenna system includes a glass plate, a resin layer, and an antenna, wherein a predetermined frequency of 3 GHz or greater is defined as F, a transmission coefficient S21 of the glass plate concerning an incident wave of F is defined as $S21_G$, S21 of a laminate concerning the F is defined as $S21_{GR}$, a frequency closest to F at which S21 of the glass plate becomes a maximum is defined as $F_P$, S21 of the glass plate concerning an incident wave of $F_P$ is defined as $S21_{GP}$, a frequency closest to F among frequencies of incident waves at which S21 of the glass plate becomes a minimum is defined as $F_V$, and S21 of the glass plate concerning an incident wave of $F_V$ is defined as $S21_{GV}$, and wherein a thickness of the resin layer is configured such that: $S21_{GR} - S21_G \geq (S21_{GP} - S21_{GV}) \times 0.2$.

19 Claims, 13 Drawing Sheets

(58) Field of Classification Search
CPC .............. B32B 2605/00; B32B 17/10; B32B 17/10005; B32B 17/10165
See application file for complete search history.

(56) References Cited

U.S. PATENT DOCUMENTS

| | | | | |
|---|---|---|---|---|
| 2013/0257664 | A1* | 10/2013 | Kagaya | H01Q 1/1271 343/720 |
| 2017/0207514 | A1* | 7/2017 | Kamo | B32B 7/05 |
| 2018/0037006 | A1* | 2/2018 | Droste | B32B 17/10183 |
| 2018/0037007 | A1* | 2/2018 | Droste | B32B 17/10036 |
| 2018/0366838 | A1 | 12/2018 | Kim et al. | |
| 2020/0193259 | A1* | 6/2020 | Thangamani | G06K 19/07749 |
| 2021/0256230 | A1* | 8/2021 | Holtstiege | G06K 19/07773 |
| 2021/0273321 | A1* | 9/2021 | Takeuchi | B32B 27/302 |
| 2022/0059948 | A1* | 2/2022 | Sayama | H01Q 1/1271 |
| 2022/0102864 | A1* | 3/2022 | Morimoto | H05K 1/0277 |
| 2022/0200156 | A1* | 6/2022 | Sonoda | H01Q 1/1271 |
| 2022/0306015 | A1* | 9/2022 | Yamaguchi | B60R 11/04 |
| 2022/0347974 | A1* | 11/2022 | Sadakane | B32B 3/10 |
| 2022/0352620 | A1* | 11/2022 | Morimoto | H01Q 1/364 |
| 2022/0416414 | A1* | 12/2022 | Takahashi | H01Q 1/42 |
| 2023/0096675 | A1* | 3/2023 | Chiba | B32B 17/10532 428/38 |
| 2023/0234883 | A1* | 7/2023 | Aoshima | C03C 17/326 65/60.1 |
| 2023/0238681 | A1* | 7/2023 | Kato | H01Q 1/1271 343/713 |

FOREIGN PATENT DOCUMENTS

| | | |
|---|---|---|
| JP | H04-12703 A | 1/1992 |
| JP | 2016-025585 A | 2/2016 |
| WO | WO-2017/188415 A1 | 11/2017 |
| WO | WO-2022138397 A1 * | 6/2022 |

OTHER PUBLICATIONS

Hounoki et al., "Transmission of plane wave through dielectric slab," The Institute of Electronics, Information and Communication Engineers Technical Report AP88-31, published on Jun. 16, 1988, pp. 43-48.

Satoh et al., "Transmission Loss Reduction of Window Glasses Using Matching Layers in 26 GHZ Band," Journal of Electronic Communications Society, 1984/1, vol. 1, J67-B, No. 1.

Mizusawa et al., "Transmission Loss and Polarization Characteristics through a Window Glass in the Microwave Region," The Institute of Electronics, Information and Communication Engineers Technical Report A-P88-73, Oct. 19, 1988, pp. 9-14.

International Searching Authority, "International Search Report," issued in connection with International Patent Application No. PCT/JP2019/045393, dated Feb. 10, 2020.

International Searching Authority, "Written Opinion," Issued in connection with International Patent Application No. PCT/JP2019/045393, dated Feb. 10, 2020.

* cited by examiner

ANTENNA SYSTEM

CROSS-REFERENCE TO RELATED APPLICATIONS

This application is a continuation of International Application PCT/JP2019/045393, filed on Nov. 20, 2019, and designated the U.S., which is based on and claims priority to Japanese patent application No. 2018-219406 filed on Nov. 22, 2018. The entire contents of these applications are incorporated herein by reference.

BACKGROUND OF THE INVENTION

1. Field of the Invention

The present invention relates to an antenna system.

2. Description of the Related Art

In recent years, services using high-speed and high-capacity wireless communication systems using microwave and millimeter wave frequency bands have been expanding, such as the transition from 4G LTE to 5G (sub6). Specifically, the band used for such services tends to expand from the 3 GHz band to the 5 to 6 GHz band. An antenna capable of handling such a frequency band with good directivity and receiving sensitivity is required. Furthermore, V2X (Vehicle to Everything), which is expected to be used as Vehicle-to-Vehicle communication and Vehicle-to-Infrastructure communication, has been developed for many purposes, such as being used in the United States in the 5.9 GHz band. Furthermore, attempts are being made to spread the wireless communication system using frequencies higher than sub6 (for example, 28 GHz band, 40 GHz band, 60 GHz band, 70 GHz band).

Due to such high frequency band communication, for example, when transmitting/receiving with a millimeter wave radar installed in a vehicle, attenuation of gain due to window glass, which has not been noticeable in the communication of a relatively low frequency band (such as less than 1 GHz) may occur. In order to obtain a high gain in communication in a high frequency band, a configuration in which an electromagnetic wave transparent material is fitted in a part of window glass is disclosed (for example, refer to Patent Document 1).

However, the technology of Patent Document 1 introduced mechanical processing of the window glass itself, or included a component that is different from the window glass in the area where the window glass generally exists, resulting in complicated configuration and reduced productivity.

Patent Document 1: WO/2017/188415

SUMMARY OF THE INVENTION

In consideration of the above, the present disclosure provides an antenna system capable of transmitting and receiving electromagnetic waves in a predetermined high frequency band by using a glass plate having a thickness of 1.1 mm or more without complicating the configuration of the glass plate.

The present disclosure provides an antenna system that includes a glass plate with a thickness of 1.1 mm or more, a resin layer in contact with one principal surface of the glass plate, and an antenna located on an opposite side of the resin layer from a side where the glass plate is located, the antenna being spaced apart from the resin layer, wherein a predetermined frequency of 3 GHz or greater is defined as F, a transmission coefficient S21 of the glass plate alone with respect to an incident electromagnetic wave of the frequency F is defined as $S21_G$ [dB], a transmission coefficient S21 of a laminate including the glass plate and the resin layer with respect to the incident electromagnetic wave of the frequency F is defined as $S21_{GR}$ [dB], a frequency closest to the frequency F among frequencies of incident electromagnetic waves at which the transmission coefficient S21 of the glass plate alone becomes a local maximum is defined as $F_P$, a transmission coefficient S21 of the glass plate alone with respect to an incident electromagnetic wave of the frequency $F_P$ is defined as $S21_{GP}$ [dB], a frequency closest to the frequency F among frequencies of incident electromagnetic waves at which the transmission coefficient S21 of the glass plate alone becomes a local minimum is defined as $F_V$, a transmission coefficient S21 of the glass plate alone with respect to an incident electromagnetic wave of the frequency $F_V$ is defined as $S21_{GV}$ [dB], and wherein a thickness of the resin layer is configured such that: $S21_{GR} - S21_G \geq (S21_{GP} - S21_{GV}) \times 0.2$.

According to the technique of the present disclosure, an antenna system can be provided that reduces the decreasing of transmission coefficient in an electromagnetic wave of a predetermined high frequency band by using a glass plate having a thickness of 1.1 mm or more without complicating the configuration of the glass plate.

DESCRIPTION OF THE PREFERRED EMBODIMENTS

Hereinafter, embodiments according to the present disclosure will be described with reference to the drawings. Furthermore, in each of the embodiments, deviation in a direction such as parallel, right-angle, orthogonal, horizontal, vertical, top and bottom, left and right, or the like is allowed to the extent that the effect of the present invention is not impaired. Furthermore, the X-axis direction, the Y-axis direction, and the Z-axis direction respectively represent a direction parallel to the X-axis, a direction parallel to the Y-axis, and a direction parallel to the Z-axis. The X-axis direction, the Y-axis direction, and the Z-axis direction are orthogonal to each other. The XY plane, the YZ plane, and the ZX plane respectively represent a virtual plane parallel to the X-axis direction and the Y-axis direction, a virtual plane parallel to the Y-axis direction and the Z-axis direction, and a virtual plane parallel to the Z-axis direction and the X-axis direction.

An antenna system of the present embodiment is used for transmitting signals in a high frequency band (for example, 3 GHz to 300 GHz) such as microwaves and millimeter waves. Such high frequency bands include an SHF band of 3 to 30 GHz and an EHF band of 30 to 300 GHz.

An antenna system of the present embodiment may be used in a wireless LAN (Local Area Network) standard such as a 5th generation mobile communication system (so-called 5G), IEEE802.11ac, and IEEE802.11ad. Furthermore, an antenna system of the present embodiment, when used in a vehicle, may be used in an on-vehicle radar system irradiating radar, a V2X communication system of Vehicle-to-Vehicle communication or Vehicle-to-Infrastructure communication, or Cellular V2X (C-V2X) standard by 3GPP (3rd Generation Partnership Project) that revises and adjusts the specification of the standards of the mobile communication system.

An antenna system of the present embodiment is not limited to a vehicle, but may be applied to a building or an electronic device.

An antenna system of the present embodiment includes a glass plate with a thickness of 1.1 mm or more and an antenna being spaced apart from the surface of the glass plate. When an antenna receives or transmits electromagnetic waves through a glass plate, the higher the frequency band, the more electromagnetic waves tend to be transmitted attenuated as they pass through the glass plate. Accordingly, a transmission loss of electromagnetic waves by the glass plate is required to be reduced. As the glass plate, for example, in the case of a single glass sheet for a vehicle, glass having a thickness of 2 mm or more, a thickness of 3 mm or more, or a thickness of 4 mm or more is used.

Furthermore, the upper limit of the thickness is not particularly limited, but in the case of a single glass sheet for a vehicle, glass having a thickness of 6 mm or less or a glass having a thickness of 5 mm or less is used.

Figure 1:
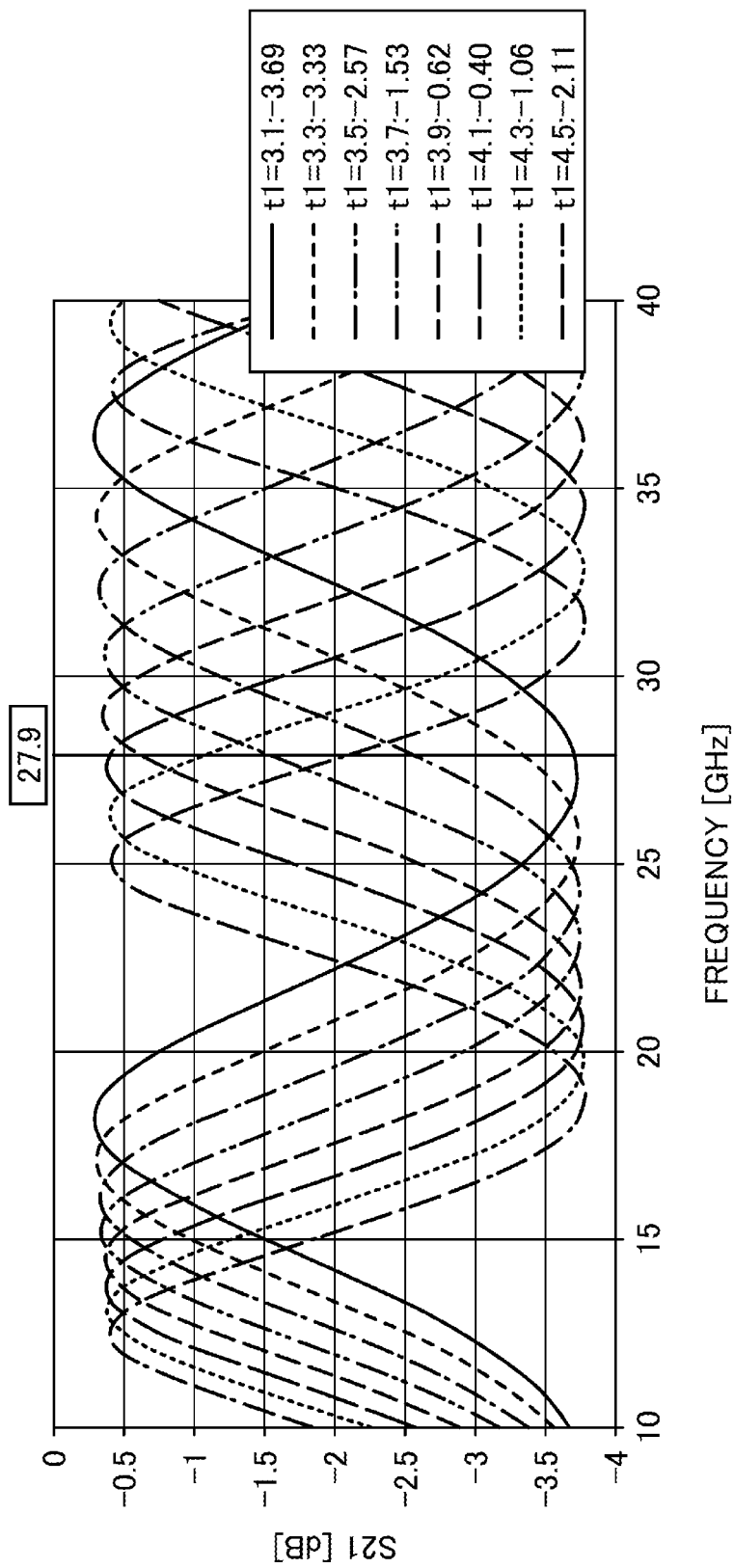
FIG. 1 is a diagram illustrating the frequency characteristics of a transmission coefficient of a glass plate alone with respect to an incident electromagnetic wave.

FIG. 1 is a diagram illustrating a simulation result of a transmission coefficient S21 of a glass plate alone with respect to the frequency of electromagnetic waves incident on the glass plate from the direction normal to the principal surface thereof. A transmission coefficient S21 is one of the S-parameters (scattering parameters) and is an index indicating the degree to which electromagnetic waves incident on an object pass through the object. The transmission coefficient S21 is a negative value, and the larger the transmission coefficient S21 (closer to zero), the smaller the degree of attenuation (that is, the smaller the transmission loss). The legend shows the transmission coefficient S21 (unit: dB) at the frequency of 27.9 GHz with respect to the thickness (unit: mm) t1 of each glass plate.

As shown in FIG. 1, a transmission coefficient S21 differs depending on the frequency of the electromagnetic wave incident on the glass plate and changes approximately periodically with respect to the frequency. The transmission coefficient S21 also changes depending on the thickness t1 of the glass plate. Therefore, when the transmission coefficient S21 with respect to the frequency of the electromagnetic wave used is relatively low, the transmission coefficient S21 may be adjusted to be increased by changing the thickness t1. For example, when the frequency of the electromagnetic wave used is 27.9 GHz and the thickness t1 is 3.1 mm, the transmission coefficient S21 is approximately −3.69 dB. In this regard, by changing the thickness t1 to 4.1 mm, the transmission coefficient S21 can be increased to approximately −0.40 dB, so that the transmission loss can be reduced.

However, for example, a thickness of a glass plate used for window glass of a vehicle, a building, or the like is generally determined to be within a predetermined thickness range from the required specifications such as strength. Therefore, it is often difficult to freely change the thickness of the glass plate.

In consideration of the above, a configuration of an antenna system of the present embodiment has an effect equivalent to changing the thickness of the glass plate. Next, the configuration of the antenna system of the present embodiment will be described in detail.

Figure 2:
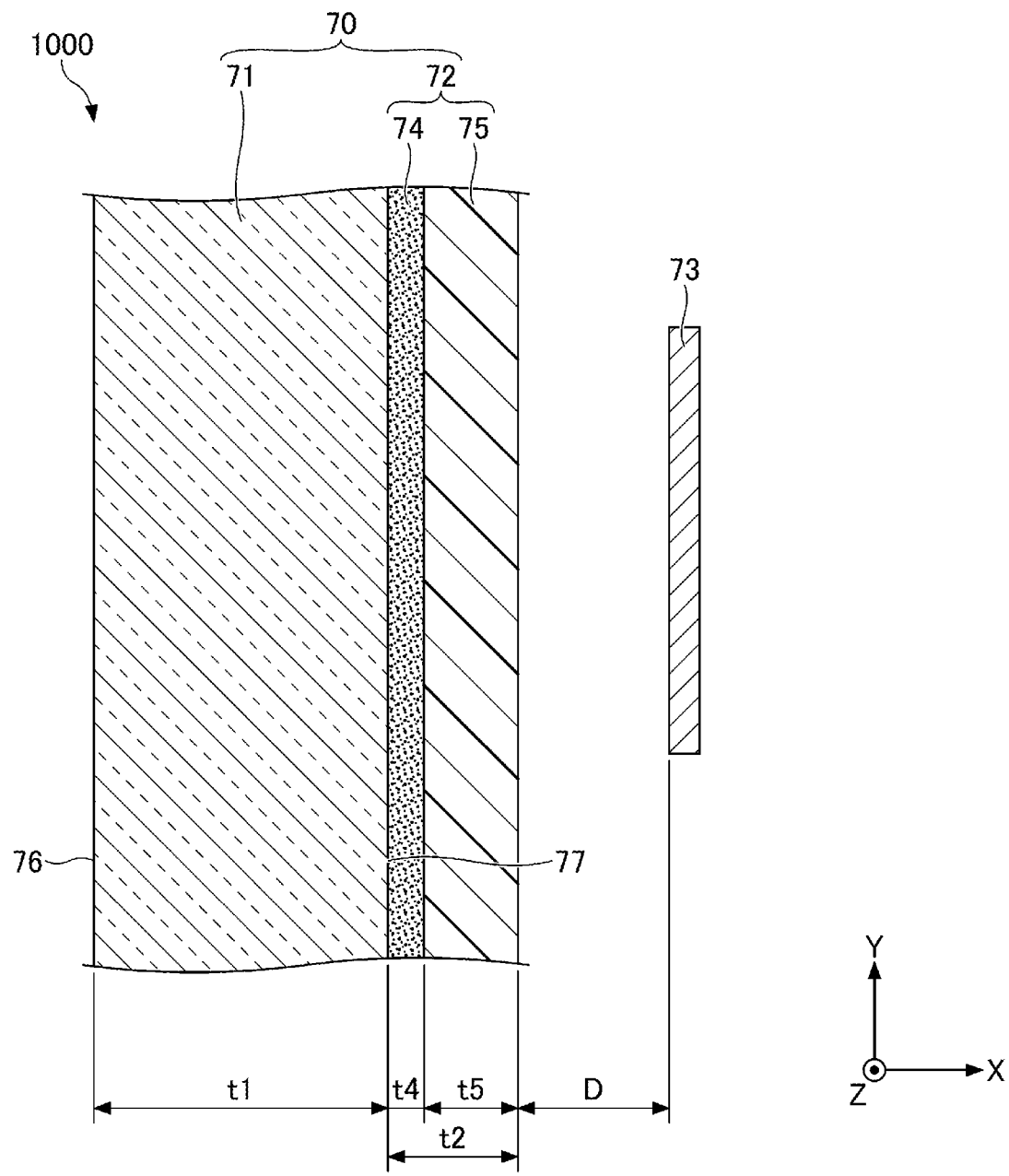
FIG. 2 is a partial cross-sectional view illustrating an antenna system of the present embodiment.

FIG. 2 is a partial cross-sectional view illustrating the antenna system of the present embodiment. The antenna system 1000 shown in FIG. 2 includes a laminate 70 and an antenna 73 being spaced apart from the laminate 70 in the X-axis direction. A laminate 70 has a structure in which a glass plate 71 and a resin layer 72 are laminated in the X-axis direction. The X-axis direction corresponds to the normal direction of the principal surface of the glass plate 71.

The glass plate 71 has a first surface 77 and a second surface 76 on the opposite side of the first surface 77 as its principal surface and has a thickness t1 of 1.1 mm or more. For example, if the glass plate 71 is glass for a vehicle, a glass having a thickness of 2 mm or more, a thickness of 3 mm or more, or a thickness of 4 mm or more is used. The first surface 77 is one principal surface of the glass plate 71, and the second surface 76 is the other principal surface of the glass plate 71. The thickness t1 represents the thickness in the X-axis direction between the first surface 77 and the second surface 76.

The upper limit of the thickness t1 is not particularly limited as long as the gain required for the antenna 73 is secured. For example, if the glass plate 71 is used for a window glass of a vehicle, the thickness t1 may be 6 mm or less or 5 mm or less. When the glass plate 71 is laminated glass having a structure in which, for example, an interlayer such as resin is sandwiched between two glass plates, the thickness t1 is 10 mm (=5 mm×2)+interlayer thickness or less. A thickness of an interlayer used for the laminated glass is generally 0.2 mm to 2 mm. Therefore, the thickness of the laminated glass is often 12 mm or less. Furthermore, for example, if the glass plate 71 is glass for a railway vehicle or the like, the thickness t1 is often greater than 6 mm, and considering such use, the laminated glass may be not limited to 12 mm or less and may be 25 mm or less.

A resin layer 72 is in contact with the first surface 77 of the glass plate 71. In an embodiment shown in FIG. 2, a resin layer 72 includes a resin portion 75 having a main component as a resin, and an adhesive portion 74 interposed between the first surface 77 and the resin portion 75. The adhesive portion 74 adheres the resin portion 75 to the first surface 77. Note that a resin layer 72 may be in the form of a single layer, more specifically, in the form of only having an adhesive portion 74, or in the form of not having an adhesive portion 74.

An antenna 73 is located on an opposite side of the resin layer 72 from a side where the glass plate 71 is located and is spaced apart from the resin layer 72. For example, an antenna 73 is attached to the side of the first surface 77 of the glass plate 71 via a box-shaped bracket (not shown) so as to be spaced apart from the surface of the resin layer 72 (the surface of the resin portion 75 in FIG. 2). Note that a resin portion 75 may be a part of a bracket that supports the antenna 73. As material of the bracket contains a same material as in the resin layer 72, the resin layer 72 and the bracket can be easily integrated. In such a case, a transmission coefficient S21 of a high frequency band can be increased by adjusting the thickness t2 of a part of the bracket corresponding to the resin layer 72.

An antenna 73 is formed so as to be able to transmit and receive electromagnetic waves of a predetermined frequency F having a frequency of 3 GHz or higher. The form of the antenna 73 is not limited as long as it is formed so as to be able to transmit and receive electromagnetic waves of a predetermined frequency F. Specific examples of the antenna 73 may include a planar antenna such as a microstrip antenna.

Figure 3:
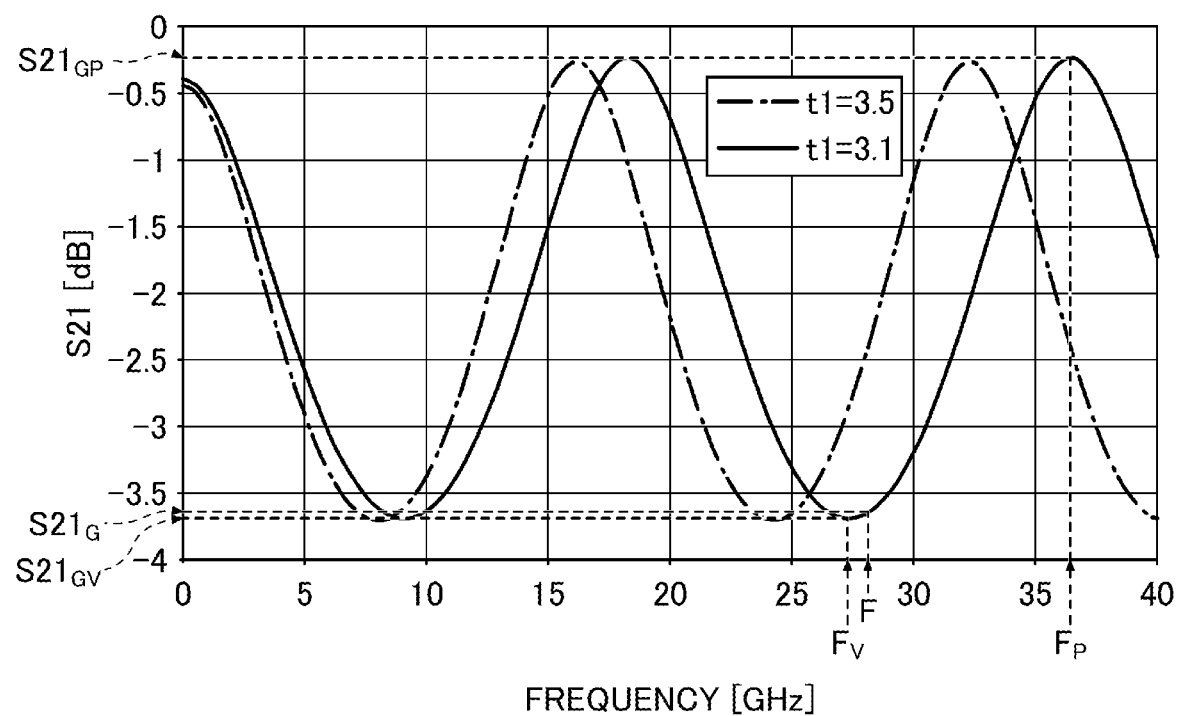
FIG. 3 is a diagram illustrating the frequency characteristics of a transmission coefficient of a glass plate alone with respect to an incident electromagnetic wave.

FIG. 3 is a diagram illustrating a simulation result of a transmission coefficient S21 of the glass plate 71 alone with respect to the frequency of electromagnetic waves incident on the glass plate 71 from the direction normal to the surface of the glass plate 71. FIG. 3 shows a case where the thickness t1 of the glass plate 71 is 3.1 mm and a case where the thickness t1 is 3.5 mm.

Hereinafter, a transmission coefficient S21 of the glass plate 71 alone with respect to the incident electromagnetic wave of the frequency F is defined as $S21_G$ [dB]. Furthermore, among the frequencies of the incident electromagnetic waves at which a transmission coefficient S21 of the glass plate 71 becomes a local maximum, the frequency closest to the frequency F is defined as $F_P$. Furthermore, a transmission coefficient S21 of the glass plate 71 alone with respect to the incident electromagnetic wave of the frequency $F_P$ is defined as $S21_{GP}$ [dB]. Furthermore, among the frequencies of the incident electromagnetic waves at which a transmission coefficient S21 of the glass plate 71 becomes a local minimum, the frequency closest to the frequency F is defined as $F_V$. Furthermore, a transmission coefficient S21 of the glass plate 71 alone with respect to the incident electromagnetic wave of the frequency $F_V$ is defined as $S21_{GV}$ [dB].

An incident electromagnetic wave represents an electromagnetic wave incident on the principal surface of the glass plate 71 from the direction normal thereto. [DB] represents the unit "decibel".

Furthermore, in an embodiment shown in FIG. 2, a transmission coefficient S21 of a laminate 70 including the glass plate 71 and the resin layer 72 with respect to the incident electromagnetic wave of the frequency F is defined as $S21_{GR}$ [dB]. With regard to this embodiment, the present inventors found that by adjusting the thickness t2 of the resin layer 72 to be configured such that "$S21_{GR}-S21_G \geq (S21_{GP}-S21_{GV}) \times 0.2$", the electromagnetic wave of frequency F can be transmitted and received efficiently without changing the thickness t1 of the glass plate 71. In other words, by a resin layer 72 with a thickness t2 configured such that "$S21_{GR}-S21_G \geq (S21_{GP}-S21_{GV}) \times 0.2$", the transmission coefficient S21 becomes larger than in a case of a transmission coefficient S21 without a resin layer 72 and the transmission loss can be reduced.

As is clear from FIG. 3, ($S21_{GP}-S21_{GV}$) represents the peak value of S21 in the frequency band near the frequency F. Therefore, "$S21_{GR}-S21_G \geq (S21_{GP}-S21_{GV}) \times 0.2$" means that when the peak value ($S21_{GP}-S21_{GV}$) is set to 100%, the transmission coefficient S21 is improved by 20% or more with respect to the peak value by adding the resin layer 72.

In the present embodiment, when the transmission coefficient $S21_G$ of the glass plate 71 at the frequency F is relatively low, for example, if "$S21_G \leq -(S21_{GP}-S21_{GV}) \times 0.5$" is satisfied, the improvement effect of the transmission coefficient S21 due to adding the resin layer 72 is high.

Furthermore, in the present embodiment, when a frequency F is in the range of a 5 to 6 GHz band, 28 GHz band (26 to 29 GHz), 40 GHz band (38 to 40 GHz), 60 GHz band (57 to 66 GHz), and 70 GHz band (76 to 81 GHz), the improvement effect of the transmission coefficient S21 due to adding the resin layer 72 is higher than when the frequency F is in the other ranges.

From the viewpoint of reducing transmission loss, the resin layer 72 more preferably has a thickness t2 configured such as "$S21_{GR}-S21_G \geq (S21_{GP}-S21_{GV}) \times 0.4$", and further preferably has a thickness t2 configured such that "$S21_{GR}-S21_G \geq (S21_{GP}-S21_{GV}) \times 0.6$". Furthermore, the resin layer 72 especially preferably has a thickness t2 configured such that "$S21_{GR}-S21_G \geq (S21_{GP}-S21_{GV}) \times 0.8$", and most preferably has a thickness t2 configured such that "$S21_{GR}-S21_G \geq (S21_{GP}-S21_{GV}) \times 0.9$".

Figure 4:
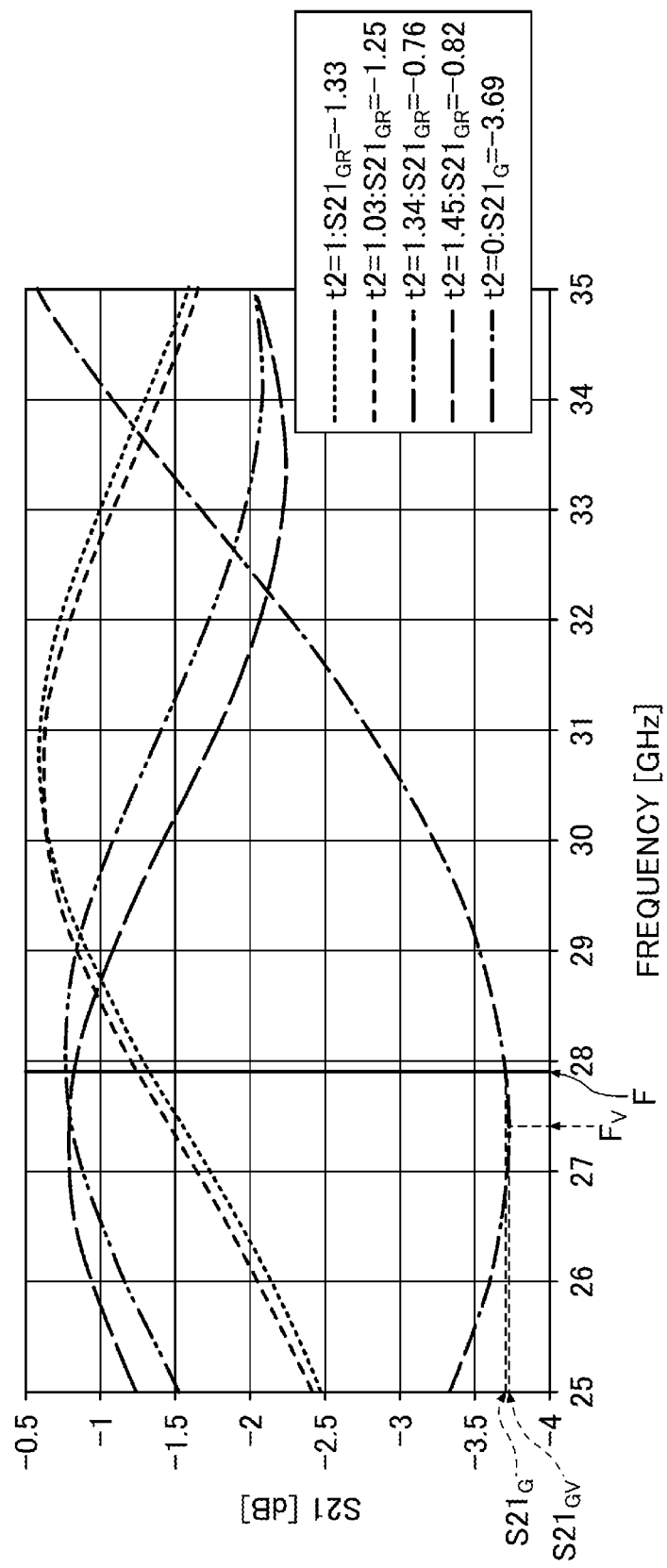
FIG. 4 is a diagram illustrating the frequency characteristics of a transmission coefficient due to the difference in the thickness of the resin layer.

FIG. 4 is a diagram illustrating the frequency characteristics of a transmission coefficient due to the difference in the thickness t2 of the resin layer 72. FIG. 4 shows a simulation result of a transmission coefficient S21 of the laminate 70 with respect to the frequency of the electromagnetic waves incident on the laminate 70 from the direction normal to the principal surface.

The legend shows the transmission coefficient S21 (unit: dB) when the frequency F is 27.9 GHz at the thickness t2 (unit: mm) of each resin layer 72.

The waveform when t2=0 indicates the case without a resin layer 72 and indicates a change of the transmission coefficient S21 of the glass plate 71 alone. Furthermore, the glass plate 71 has a thickness t1 of 3.1 mm, a relative permittivity of 7, and a dielectric loss tangent (so-called tan δ) of 0.01. Furthermore, the resin layer 72 has a relative permittivity of 3.6 and a dielectric loss tangent of 0.01. In this case, a resin layer 72 is composed of only a resin portion 75 and, as an example, PBT-GF30 (polybutylene terephthalate glass fiber 30%) is assumed. Even if a resin layer 72 is composed of an adhesive portion 74 and a resin portion 75, or is composed of only an adhesive portion 74, a material with a predetermined relative permittivity and dielectric loss tangent may be appropriately applied with a predetermined thickness.

Note that a relative permittivity and a dielectric loss tangent of the glass plate are measured at 3 GHz in an environment of room temperature of 24° C. and humidity of 30% using a measuring device with a method using a coaxial resonator. Furthermore, a relative permittivity and a dielectric loss tangent of the PBT-GF30 are measured at 5 GHz in an environment of room temperature 23° C. and humidity of 40% using a measuring device with a method using a cavity resonator based on Japanese Industrial Standard (JIS C2565). Furthermore, a resonator for measuring a flat plate specified in Japanese Industrial Standard (JIS R 1641:2007) may be used for measuring a relative permittivity and a dielectric loss tangent in microwaves. Furthermore, a method using a cavity resonator, a method using a Fabry-Perot open resonator, a method using a waveguide sample holder, and a method of measuring using a free-space method are proposed and may be used for submillimeter and millimeter wave bands. It is known that a relative permittivity of glass gradually decreases with the increase in frequency, and a dielectric loss tangent of glass gradually increases with the increase in frequency. An actual measurement of a relative permittivity and a dielectric loss tangent of glass may vary depending on measurement accuracy and the shape of the measurement sample by the above methods. However, since the change in the value of the relative permittivity and the dielectric loss tangent within the predetermined frequency range is small, the transmittance (S21 parameter) is calculated with the relative permittivity and the dielectric loss tangent at the predetermined frequency as a representative value (constant value).

When there is no resin layer 72 (t2=0), the transmission coefficient $S21_G$ of the glass plate 71 alone with respect to the frequency F (=27.9 GHz) is approximately −3.69 dB. On the other hand, by providing a resin layer 72 (a resin portion 75 in this case) with a thickness of t2 on the first surface 77 of the glass plate 71, the transmission coefficient $S21_{GR}$ of the laminate 70 with respect to the frequency F increases. By providing a resin layer 72 (a resin portion 75 in this case) with a thickness t2 of approximately 1.34 mm on the first surface 77 of the glass plate 71, the transmission coefficient $S21_{GR}$ at frequency F is improved to approximately −0.76 dB. In this regard, the improvement amount ($S21_{GR}$−$S21_G$) with respect to the case of the glass plate 71 alone is approximately 2.93 dB (=−0.76−(−3.69)). This improvement amount sufficiently satisfies "$S21_{GR}$−$S21_G$≥($S21_{GP}$−$S21_{GV}$)×0.2", and further satisfies "$S21_{GR}$−$S21_G$≥($S21_{GP}$−$S21_{GV}$)×0.8". An improvement amount ($S21_{GR}$−$S21_G$) depends on $S21_G$ at a predetermined frequency F of the glass plate 71 alone and may be 0.50 dB or more, preferably 1.00 dB or more, more preferably 2.00 dB or more, and further preferably 2.50 dB or more.

Next, the configuration of the antenna system 1000 of the present embodiment will be described in more detail.

Specific examples of an adhesive portion 74 include glue and adhesive tape. A thickness t4 of an adhesive portion 74 is preferably 0.1 mm or more and 2.0 mm or less, and more preferably 0.2 mm or more and 1.8 mm or less, from the viewpoint of reducing transmission loss. If the thickness t4 is less than 0.1 mm, the strength of the adhesive portion 74 may be lower than that in the case of 0.1 mm or more. If the thickness t4 exceeds 2.0 mm, the measurement accuracy of the thickness t2 of the resin layer 72 may decrease as compared with the case where the thickness t4 is 2.0 mm or less.

Specific examples of a resin portion 75 include PBT-GF30 (polybutylene terephthalate, glass fiber 30%) used for such as brackets as interior materials for vehicles. In order to reduce transmission loss, a resin portion 75 preferably has a relative permittivity close to the relative permittivity of the glass plate 71 and a low dielectric loss tangent. However, for a resin portion 75, the type of resin and the type and amount of filler to be added such as glass fiber may also be determined depending on the required strength, heat resistance, and the like. Furthermore, when a resin portion 75 is manufactured by injection molding, the type of resin may be appropriately selected depending on the moldability. A resin portion 75 is not limited to PBT-GF30, and resins used in vehicles such as filler additives such as PC (polycarbonate) and its glass fiber, ABS (Acrylonitrile butadiene styrene) and PC polymer alloy, PEI (polyetherimide), ASA (Acrylonitrile styrene acrylic) or the like may be used. Furthermore, if a resin portion 75 is a resin molded product obtained by injection molding, it can be manufactured so as to follow the shape of the glass surface. The relative permittivity of a resin portion 75 is preferably 1.5 or more and 10 or less, and more preferably 2.0 or more and 8 or less, from the viewpoint of reducing transmission loss.

Although a thickness t5 of a resin portion 75 is not particularly limited as long as transmission loss is reduced, 0.2 mm or more and 10 mm or less is preferable and 0.5 mm or more and 8 mm or less is more preferable, from the viewpoint of both reducing transmission loss and miniaturization (low profile). Furthermore, even in the above preferable range, when a plurality of thicknesses t5 of the resin portion 75 capable of reducing transmission loss exist, the thinner thickness t5 of them can achieve miniaturization (low profile) more preferably. However, the thickness t5 of the resin portion 75 is determined in consideration of the strength of the resin portion 75 and the manufacturing method (for example, injection molding).

A dielectric loss tangent of the glass plate 71 is preferably 0.05 or less, and more preferably 0.01 or less at a frequency of 3 GHz or higher from the viewpoint of reducing transmission loss. The dielectric loss tangent of an adhesive portion 74 and a resin portion 75 are also preferably a relatively low value from the viewpoint of reducing transmission loss.

A relative permittivity of the glass plate 71 may be a relatively low value from the viewpoint of reducing transmission loss. The relative permittivity of the glass plate 71 is preferably 3 or more and 9 or less, and more preferably 4 or more and 8 or less at a frequency of 3 GHz or greater.

An antenna 73 is preferably disposed at a distance D of 0.5 mm or more and 10 mm or less from the surface of the resin layer 72 on the side facing the glass plate 71 side, from the viewpoint of not affecting the resonance characteristics of the single antenna 73 due to the proximity of the glass plate 71 which is a dielectric. The distance D is preferably 1 mm or more and 9 mm or less, and more preferably 2 mm or more and 8 mm or less.

If a distance D between the antenna 73 and the resin layer 72 is different depending on the location, such as when the antenna 73 is a planar antenna and the antenna surface is inclined to at least one of the resin layer 72 and the glass plate 71, the distance D may be defined by the average value of the distance at each location. Furthermore, when the antenna 73 is a planar antenna and the antenna surface is inclined to the glass plate 71 (non-parallel), the thickness t2 of the resin layer 72 may be adjusted to increase the electromagnetic wave transmission based on the average distance between the antenna 73 and the glass plate 71.

Next, with reference to FIG. 5 to FIG. 15, a simulation result of the transmission coefficient S21 of the laminate 70 in which a resin layer 72 is provided on the first surface 77 of the glass plate 71 will be described. A glass plate 71 has a relative permittivity of 7 and a dielectric loss tangent of 0.01, unless otherwise specified. Furthermore, an adhesive portion 74 has a relative permittivity of 2 and a dielectric loss tangent of 0.01, and an acrylic foam tape is assumed as an example. In the simulation, it was assumed in the calculations that a plane wave is vertically incident.

Figure 5:
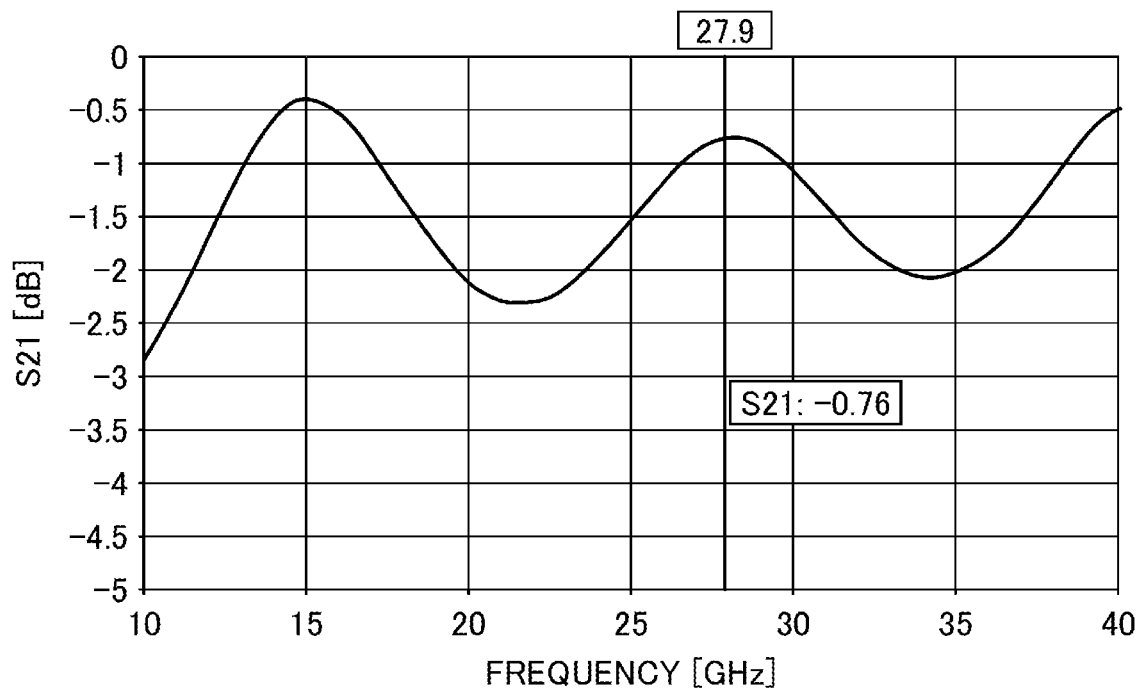
FIG. 5 is a diagram illustrating the frequency characteristics of a transmission coefficient in the first configuration example of the laminate.
Figure 6:
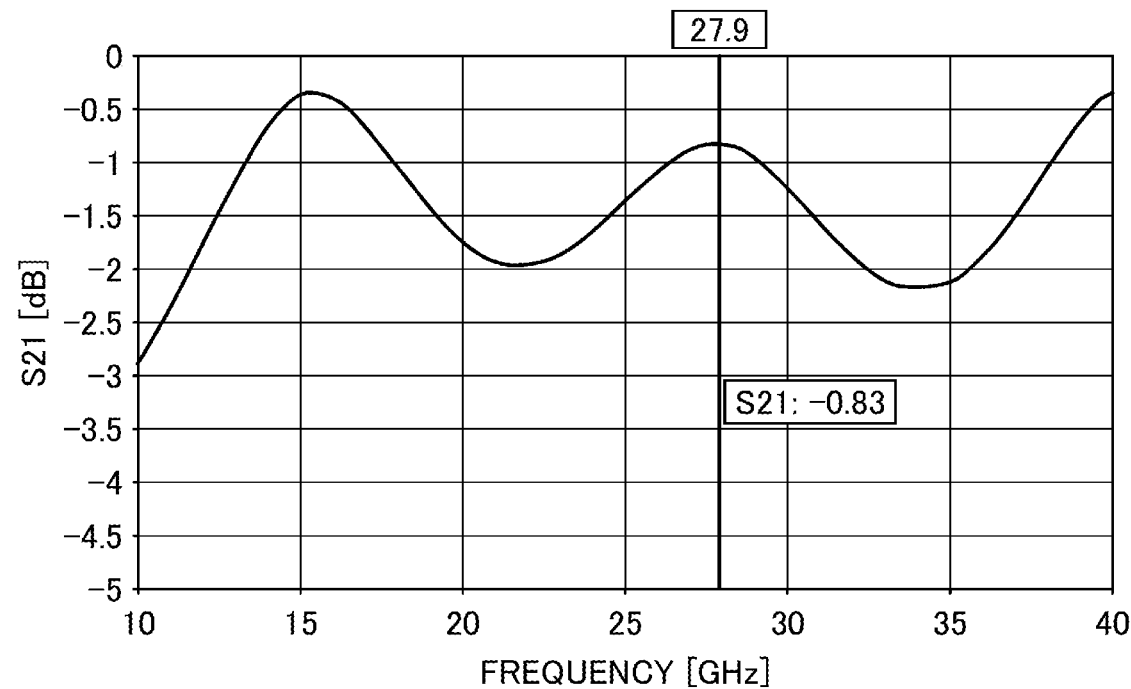
FIG. 6 is a diagram illustrating the frequency characteristics of a transmission coefficient in the second configuration example of the laminate.

FIG. 5 is a diagram illustrating the frequency characteristics of the transmission coefficient S21 of the laminate 70 when the thickness t4 of the adhesive portion 74 is 0 mm (that is, without an adhesive portion 74). FIG. 6 is a diagram illustrating the frequency characteristics of the transmission coefficient S21 of the laminate 70 when the thickness t4 of the adhesive portion 74 is 0.4 mm. Table 1 summarizes the simulation conditions and results of FIG. 5 and FIG. 6. In FIG. 5 and FIG. 6, a resin portion 75 is set to a relative permittivity of 3.6 and a dielectric loss tangent of 0.01, and PBT-GF30 (polybutylene terephthalate glass fiber 30%) is assumed as an example. The relative permittivity and dielectric loss tangent of each member are set to values based on the above standards unless otherwise specified. In particular, the frequency F is set to a value at 27.9 GHz. In other words, values with respect to the glass plate 71 are obtained by using a measuring device with a method using a coaxial resonator, and values with respect to the resin portion 75 are obtained by JIS C2565.

TABLE 1

| Thickness of glass plate t1 (mm) | Thickness of adhesive portion t4 (mm) | Optimized thickness of resin portion t5 @ $\varepsilon_r$ = 3.6 (mm) | Transmission coefficient S21 @ 27.9 GHz (dB) |
|---|---|---|---|
| 3.1 | 0 | 1.34 | −0.76 |
| 3.1 | 0.4 | 0.96 | −0.83 |

Table 1 shows the thickness t5 of the resin portion 75 in which the transmission coefficient $S21_G$ of the laminate 70 becomes a local maximum when the frequency F is 27.9 GHz in FIG. 5 and FIG. 6. At the frequency F of 27.9 GHz, the transmission coefficient S21 of the glass plate 71 alone having a thickness t1 of 3.1 mm is about −3.69 dB. That is, in either case of FIG. 5 and FIG. 6 in which the resin layer 72 is provided on the first surface 77 of the glass plate 71, the transmission coefficient S21 at 27.9 GHz is improved as compared with the case of the glass plate 71 alone. In FIG. 5, the improvement is approximately 2.93 dB, and in FIG. 6, the improvement is approximately 2.86 dB.

Figure 7:
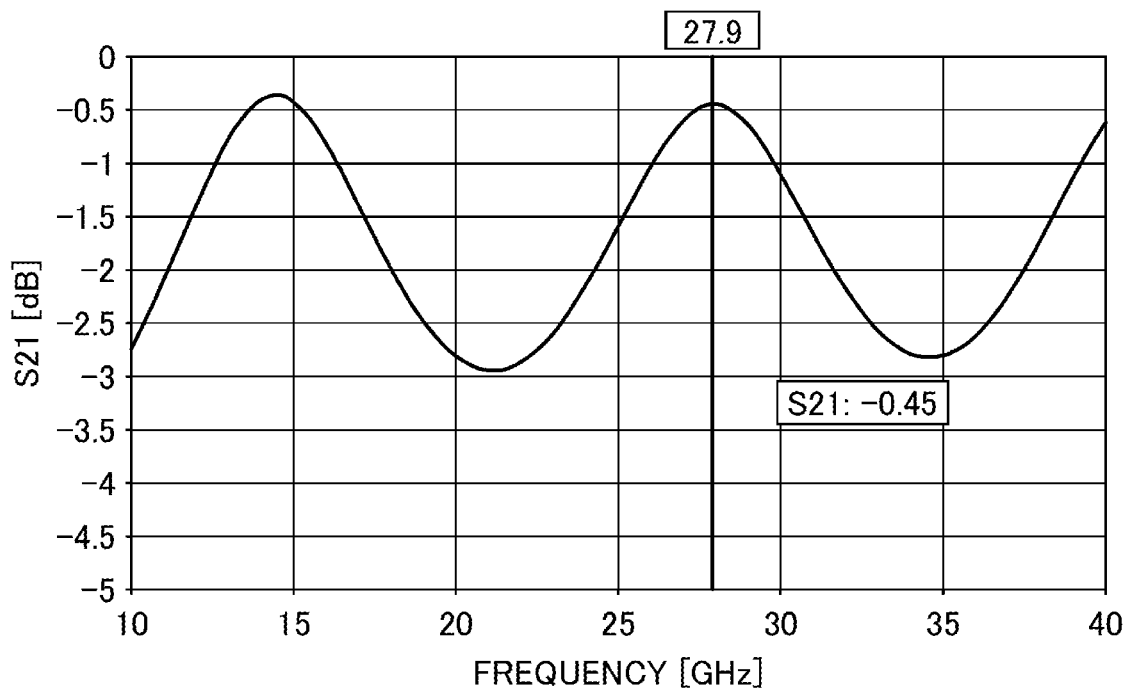
FIG. 7 is a diagram illustrating the frequency characteristics of a transmission coefficient in the third configuration example of the laminate.
Figure 8:
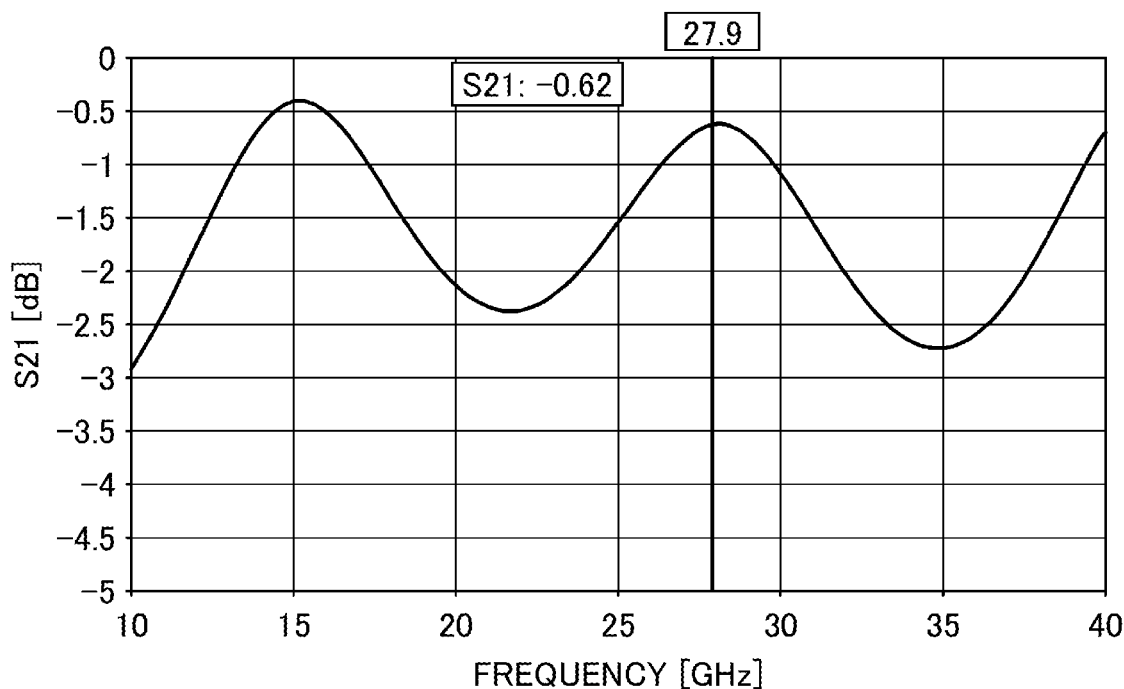
FIG. 8 is a diagram illustrating the frequency characteristics of a transmission coefficient in the fourth configuration example of the laminate.

FIG. 7 is a diagram illustrating the frequency characteristics of the transmission coefficient S21 of the laminate 70 when the thickness t4 of the adhesive portion 74 is 0 mm (that is, without an adhesive portion 74). FIG. 8 is a diagram illustrating the frequency characteristics of the transmission coefficient S21 of the laminate 70 when the thickness t4 of the adhesive portion 74 is 0.4 mm. Table 2 summarizes the simulation conditions and results of FIG. 7 and FIG. 8. In FIG. 7 and FIG. 8, a resin portion 75 is set to a relative permittivity of 5 and a dielectric loss tangent of 0.01, and polyurethane resin, polychloroprene rubber, and nitrile rubber are assumed as an example.

TABLE 2

| Thickness of glass plate t1 (mm) | Thickness of adhesive portion t4 (mm) | Optimized thickness of resin portion t5 @ $\varepsilon_r$ = 5 (mm) | Transmission coefficient S21 @ 27.9 GHz (dB) |
|---|---|---|---|
| 3.1 | 0 | 1.14 | −0.45 |
| 3.1 | 0.4 | 0.71 | −0.62 |

Table 2 shows the thickness t5 of the resin portion 75 in which the transmission coefficient $S21_G$ of the laminate 70 becomes a local maximum when the frequency F is 27.9 GHz in FIG. 7 and FIG. 8. At the frequency F of 27.9 GHz, the transmission coefficient S21 of the glass plate 71 alone having a thickness t1 of 3.1 mm is about −3.69 dB. That is, in either case of FIG. 7 and FIG. 8 in which the resin layer 72 is provided on the first surface 77 of the glass plate 71, the transmission coefficient S21 at 27.9 GHz is improved as compared with the case of the glass plate 71 alone. In FIG. 7, the improvement is approximately 3.24 dB, and in FIG. 8, the improvement is approximately 3.07 dB.

Figure 9:
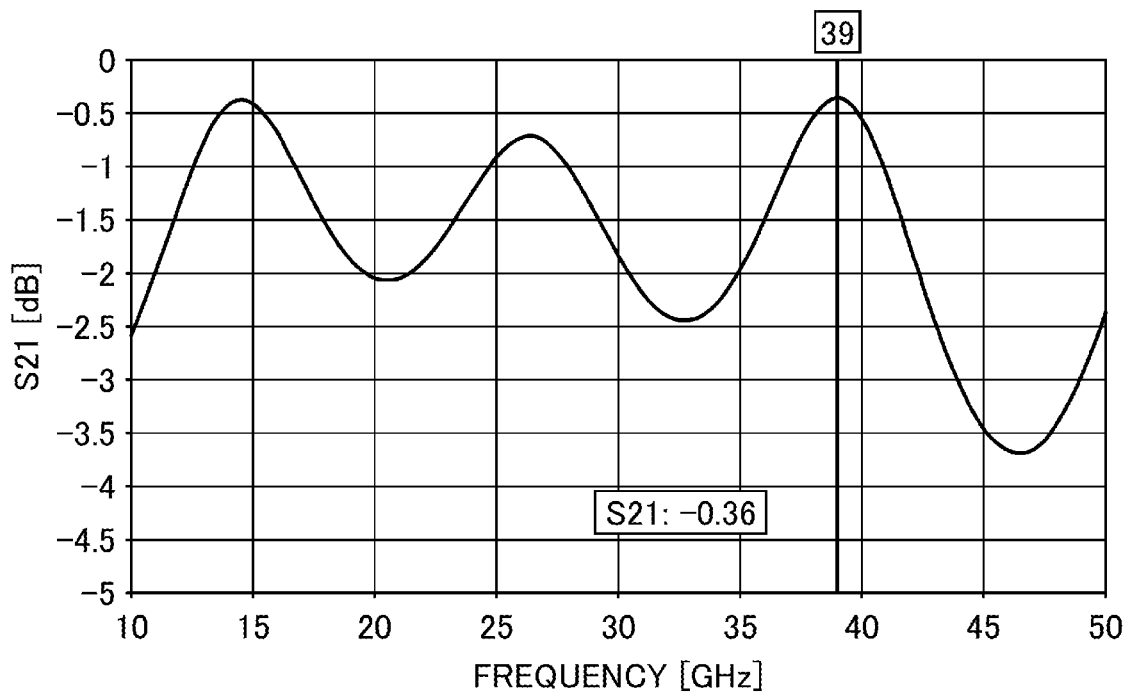
FIG. 9 is a diagram illustrating the frequency characteristics of a transmission coefficient in the fifth configuration example of the laminate.
Figure 10:
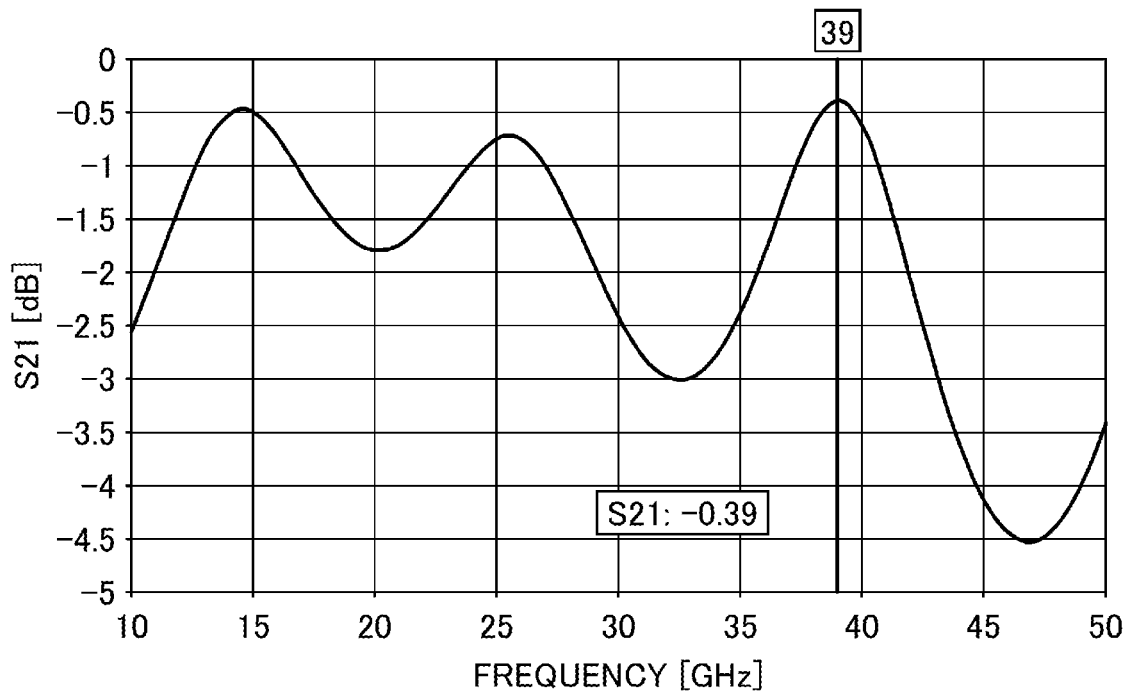
FIG. 10 is a diagram illustrating the frequency characteristics of a transmission coefficient in the sixth configuration example of the laminate.
Figure 11:
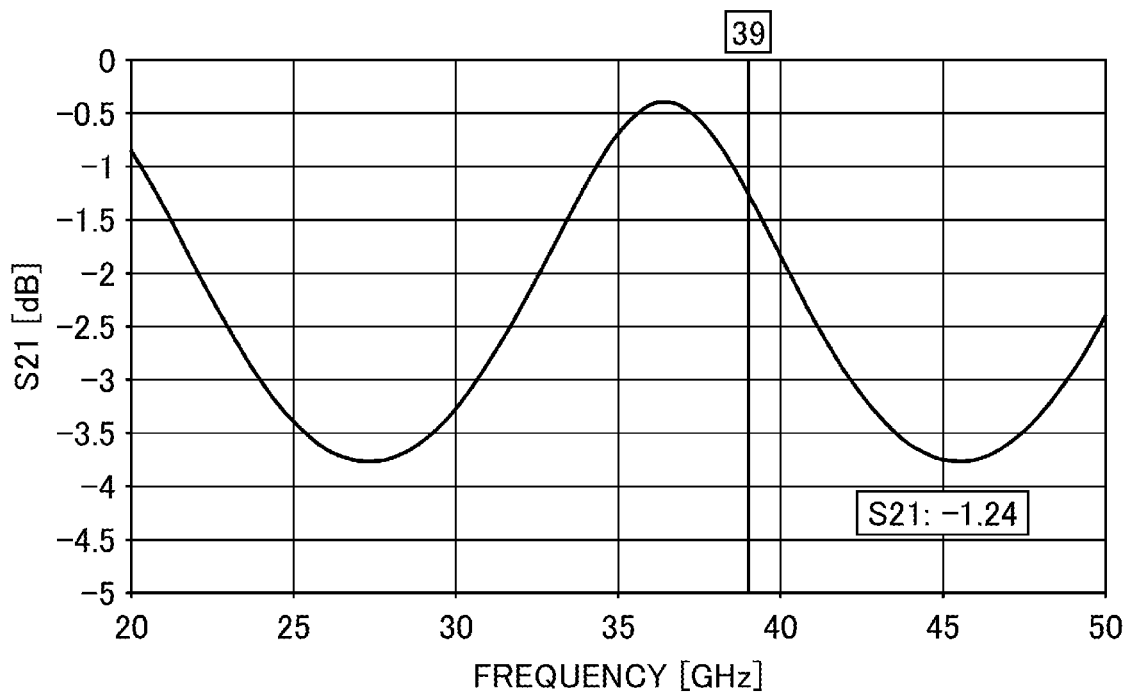
FIG. 11 is a diagram illustrating the frequency characteristics of a transmission coefficient of a glass plate alone.

FIG. 9 is a diagram illustrating the frequency characteristics of the transmission coefficient S21 of the laminate 70 when the thickness t4 of the adhesive portion 74 is 0 mm. FIG. 10 is a diagram illustrating the frequency characteristics of the transmission coefficient S21 of the laminate 70 when the thickness t4 of the adhesive portion 74 is 0.4 mm. FIG. 11 is a diagram illustrating the frequency characteristics of the transmission coefficient S21 of the glass plate 71 alone. Table 3 summarizes the simulation conditions and results of FIG. 9 to FIG. 11. In FIG. 9 to FIG. 11, a resin portion 75 is set to, at 39 GHz as the frequency F, a relative permittivity of 3.6 and a dielectric loss tangent of 0.01, and PBT-GF30 (polybutylene terephthalate class fiber 30%) is assumed as an example.

TABLE 3

| Thickness of glass plate t1 (mm) | Thickness of adhesive portion t4 (mm) | Optimized thickness of resin portion t5 @ $\varepsilon_r$ = 3.6 (mm) | Transmission coefficient S21 @ 39 GHz (dB) |
|---|---|---|---|
| 3.1 | 0 | 1.60 | −0.36 |
| 3.1 | 0.4 | 1.27 | −0.39 |
| 3.1 | 0 | 0 | −1.24 |

Table 3 shows the thickness t5 of the resin portion 75 in which the transmission coefficient $S21_G$ of the laminate 70 becomes a local maximum when the frequency F is 39 GHz in FIG. 9 and FIG. 10. Furthermore, Table 3 shows that the transmission coefficient S21 of the glass plate 71 alone is approximately −1.24 dB when the frequency F is 39 GHz in FIG. 11. That is, in either case of FIG. 9 and FIG. 10 in which the resin layer 72 is provided on the first surface 77 of the glass plate 71, the transmission coefficient S21 at 39 GHz is improved as compared with the case of the glass plate 71 alone. In FIG. 9, the improvement is approximately 0.88 dB, and in FIG. 10, the improvement is approximately 0.85 dB.

Figure 12:
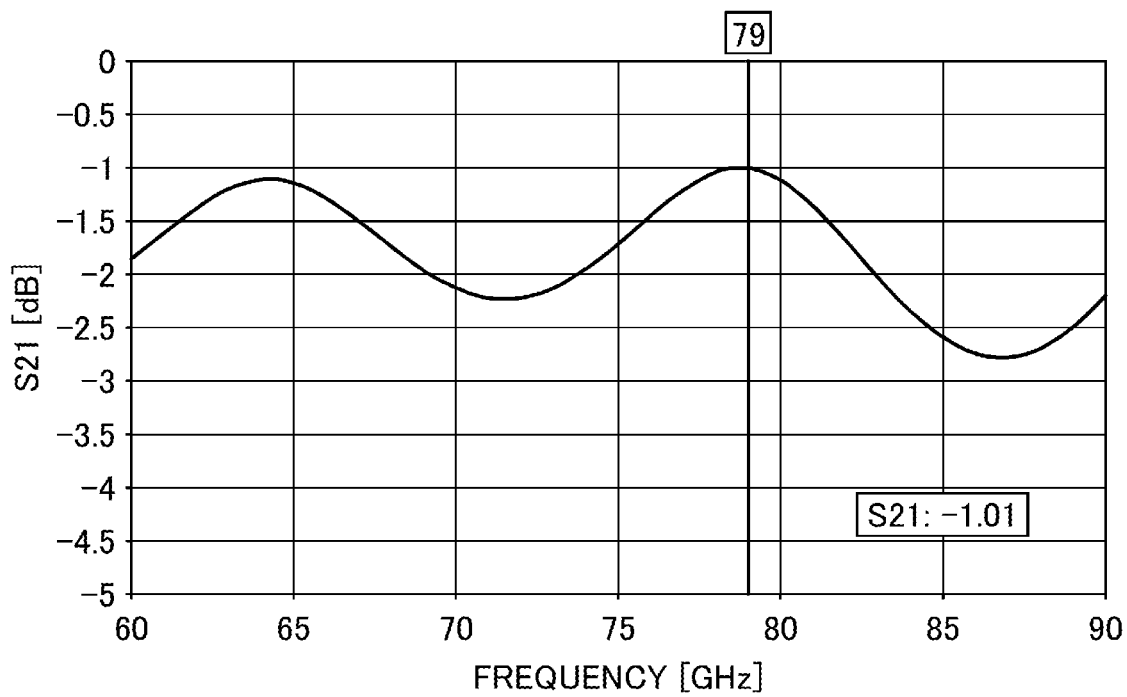
FIG. 12 is a diagram illustrating the frequency characteristics of a transmission coefficient in the seventh configuration example of the laminate.
Figure 13:
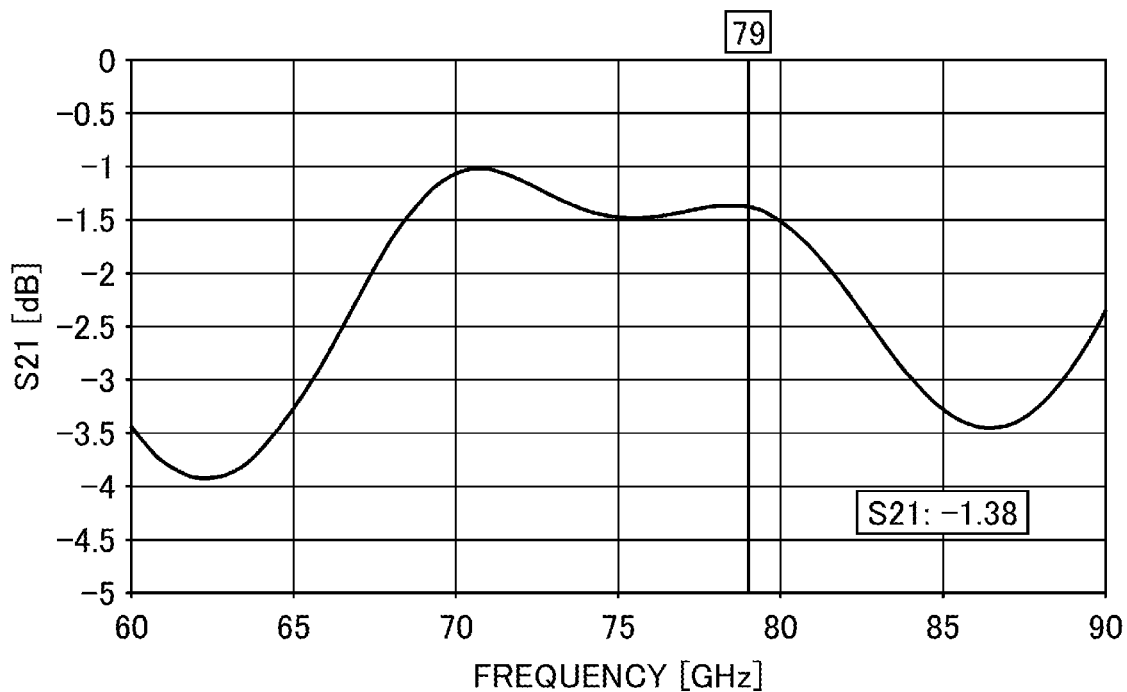
FIG. 13 is a diagram illustrating the frequency characteristics of a transmission coefficient in the eighth configuration example of the laminate.
Figure 14:
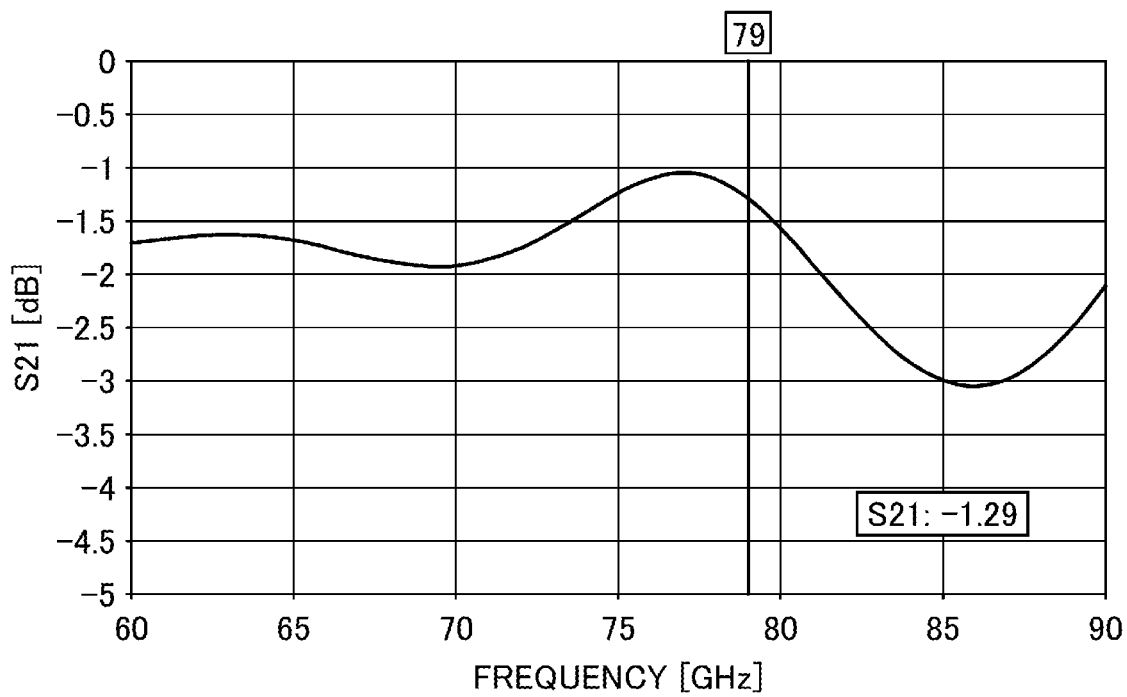
FIG. 14 is a diagram illustrating the frequency characteristics of a transmission coefficient in the ninth configuration example of the laminate.
Figure 15:
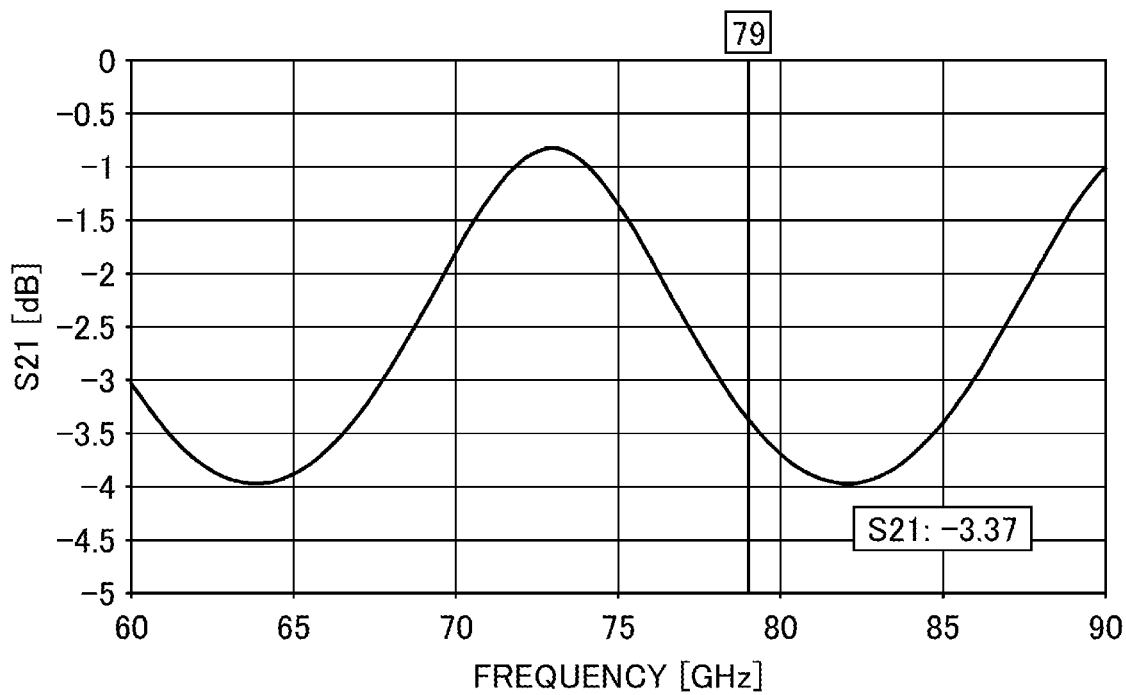
FIG. 15 is a diagram illustrating the frequency characteristics of a transmission coefficient of a glass plate alone.

FIG. 12 is a diagram illustrating the frequency characteristics of the transmission coefficient S21 of the laminate 70 when the thickness t4 of the adhesive portion 74 is 0 mm. FIG. 13 is a diagram illustrating the frequency characteristics of the transmission coefficient S21 of the laminate 70 when the thickness t4 of the adhesive portion 74 is 0.4 mm. FIG. 14 is a diagram illustrating the frequency characteristics of the transmission coefficient S21 of the laminate 70 when the thickness t4 of the adhesive portion 74 is 0.4 mm. FIG. 15 is a diagram illustrating the frequency characteristics of the transmission coefficient S21 of the glass plate 71 alone. Table 4 summarizes the simulation conditions and results of FIG. 12 to FIG. 15. In FIG. 12 to FIG. 15, a resin portion 75 is set to, at 79 GHz as the frequency F, a relative permittivity of 3.6 and a dielectric loss tangent of 0.01, and PBT-GF30 (polybutylene terephthalate glass fiber 30%) is assumed as an example.

TABLE 4

| Thickness of glass plate t1 (mm) | Thickness of adhesive portion t4 (mm) | Optimized thickness of resin portion t5 @ $\varepsilon_r$ = 3.6 (mm) | Transmission coefficient S21 @ 79 GHz (dB) |
|---|---|---|---|
| 3.1 | 0 | 0.61 | −1.01 |
| 3.1 | 0.4 | 1.18 | −1.38 |
| 3.1 | 0.4 | 0.24 | −1.29 |
| 3.1 | 0 | 0 | −3.37 |

Table 4 shows the thickness t5 of the resin portion 75 in which the transmission coefficient $S21_G$ of the laminate 70 becomes a local maximum when the frequency F is 79 GHz in FIG. 12 to FIG. 14. When the thickness t5 of the resin portion 75 was set to 1.18 mm, the transmission coefficient S21 (≈−1.29 dB) was larger than the maximum value (≈−1.38 dB) at the time of measurement in FIG. 13 (refer to FIG. 14). Furthermore, Table 4 shows that the transmission coefficient S21 of the glass plate 71 alone is approximately −3.37 dB when the frequency F is 79 GHz in FIG. 15. That is, in any case of FIG. 12 to FIG. 14 in which the resin layer 72 is provided on the first surface 77 of the glass plate 71, the transmission coefficient S21 at 79 GHz is improved as compared with the case of the glass plate 71 alone. In FIG. 12, the improvement is approximately 2.36 dB, in FIG. 13, the improvement is approximately 1.99 dB, and in FIG. 14, the improvement is approximately 2.08 dB.

Figure 16:
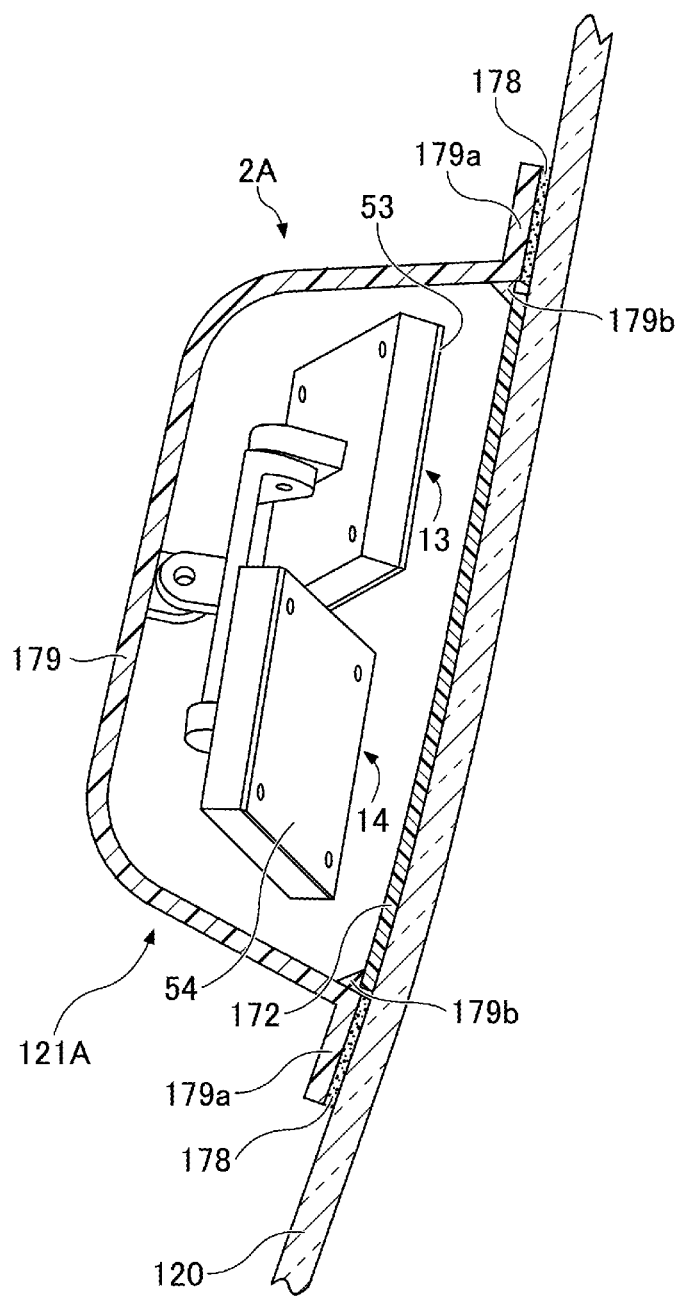
FIG. 16 is a partial cross-sectional view illustrating the first configuration example of an antenna set.

FIG. 16 is a partial cross-sectional view illustrating a first configuration example of the antenna set. The antenna set 2A shown in FIG. 16 is attached to the window glass 120. Hereinafter, the antenna set 2A will be described as an example when it is attached to window glass for a vehicle.

An antenna set 2A shown in FIG. 16 includes two antennas 13 and 14, but an antenna set 2A may include one or more than three antennas. For example, two antennas 13 and 14 may be configured to transmit and receive electromagnetic waves of the same frequency band or to transmit and receive electromagnetic waves of different frequency bands. Even when an antenna set 2A is provided with three or more antennas, a frequency band may be set appropriately which is able to transmit and receive according to the specifications. Furthermore, the antenna set may be provided in the proximity of a dielectric such as window glass or may be directly provided by being attached to or built in the dielectric. Furthermore, the dielectric material in the proximity of the antenna set 2A to be attached is not limited to the window glass but may be glass bonded to a pillar, resin, or the like. For example, the two antennas 13 and 14 (antenna set 2A) may be attached to the proximity of a resin member such as an instrument panel or lining in a vehicle as a part of the vehicle or may be attached to the vehicle interior roof together with a bracket that supports the antennas 13 and 14. The same applies to the antenna set described later.

An antenna set 2A includes a bracket 121A that supports the antennas 13 and 14 via the substrates 53 and 54. When antennas 13 and 14 are planar antennas, an antenna pattern with a predetermined shape may be provided on substrates 53 and 54. Furthermore, surfaces of the substrates 53 and 54 may be arranged parallel to the surface of the window glass 120 or may be arranged inclined.

A bracket 121A includes a cover portion 179 that covers at least a part of the antennas 13, 14, and a flange portion 179a that extends from both upper and lower ends of the cover portion 179. A bracket 121A is attached to the surface of the window glass 120 so that the antennas 13 and 14 are located in the space between the window glass 120 and the cover portion 179. A flange portion 179a is adhered to the surface of the window glass 120 by an adhesive member 178 such as glue or an adhesive tape.

An antenna set 2A is adhered to the surface of the window glass 120 by the adhesive member 178 at the flange portion 179a so that the resin plate 172 is located between the antennas 13, 14 and the window glass 120. A resin plate 172 is an example of a resin portion 75 (or a resin layer 72 of a single layer) previously described and is a member different from the bracket 121A. For example, the resin plate 172 may be attached to the surface of the window glass 120 via an adhesive portion 74 (not shown). If there is no adhesive portion 74, another component for fixing the resin plate 172 may be provided so that the resin plate 172 is in physical contact with the surface of the window glass 120. Alternatively, regardless of the presence or absence of the adhesive portion 74, a claw-shaped protrusion 179b that inserts a resin plate 172 between the window glass 120 may be provided in the proximity of the flange portion 179a inside the bracket 121A. In this case, since the resin plate 172, which is a resin portion, is a different member from the bracket 121A, the size and material of the resin plate 172 can be easily changed, and this allows the degree of reduction of transmission to be easily adjusted. As a result, the antenna gain can be easily adjusted afterward.

Figure 17:
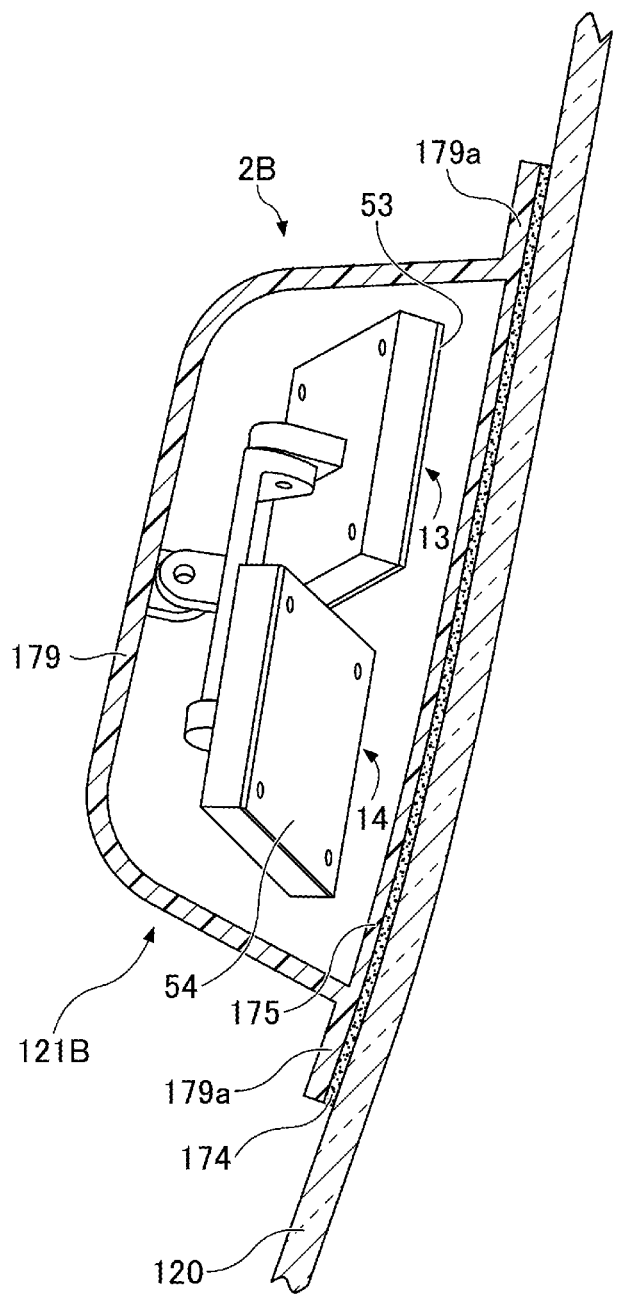
FIG. 17 is a partial cross-sectional view illustrating the second configuration example of an antenna set.

FIG. 17 is a partial cross-sectional view illustrating a second configuration example of the antenna set. The antenna set 2B shown in FIG. 17 is attached to the window glass 120. The same points as for the previously described antenna set will be omitted by referring to the previously described description.

An antenna set 2B includes a bracket 121B that supports the antennas 13 and 14 via the substrates 53 and 54. A bracket 121B includes a cover portion 179 that covers at least a part of the antennas 13, 14, a flange portion 179a that extends from both upper and lower ends of the cover portion 179, and a base portion 175 that forms a space between the base portion 175 and the cover portion 179. A bracket 121B is attached to the surface of the window glass 120 so that the antennas 13 and 14 are located in the space between the window glass 120 and the cover portion 179. A flange portion 179a and a base portion 175 are adhered to the surface of the window glass 120 by an adhesive member 174 such as glue or an adhesive tape.

An antenna set 2B is adhered to the surface of the window glass 120 by the adhesive member 174 at the flange portion 179a and the base portion 175 so that the base portion 175 is located between the antennas 13, 14 and the window glass 120. A base portion 175 is an example of a resin portion 75 previously described and is a part of the bracket 121B. An adhesive member 174 is an example of an adhesive portion 74 previously described. A base portion 175 and an adhesive member 174 are portions including at least a part of the resin layer 72 previously described. Since the base portion 175, which is a resin portion, is a part of the bracket 121B, not only transmission loss can be reduced but also the ease of attaching the antenna can be improved.

Figure 18:
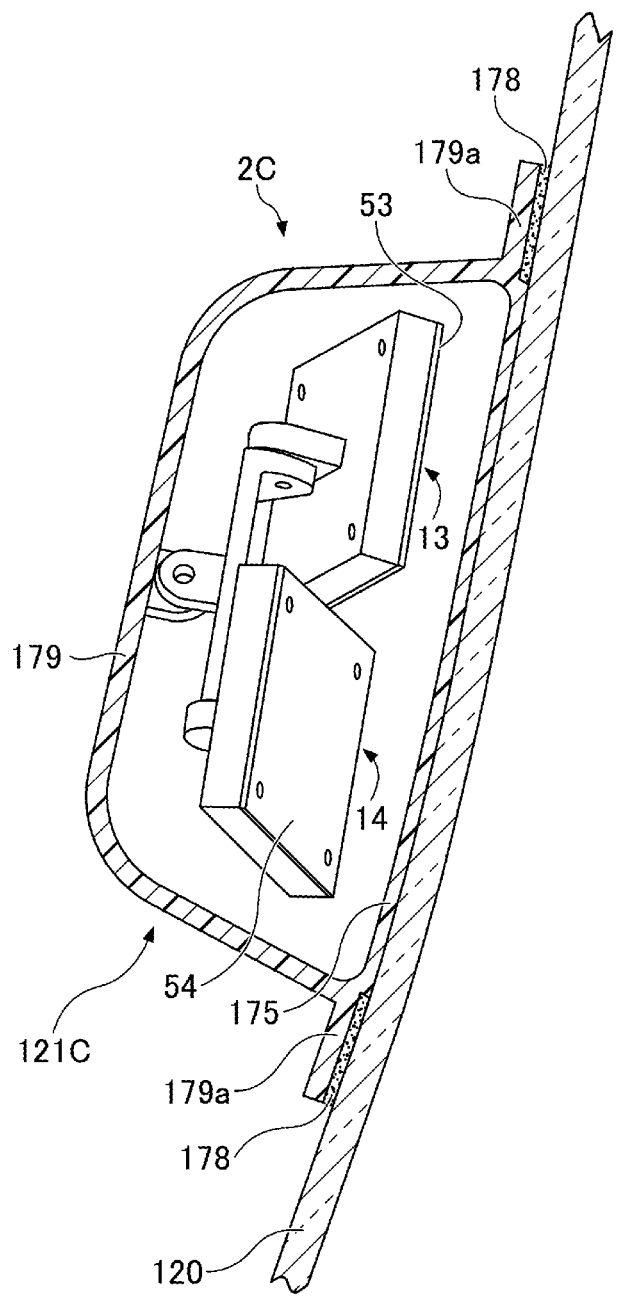
FIG. 18 is a partial cross-sectional view illustrating the third configuration example of an antenna set.

FIG. 18 is a partial cross-sectional view illustrating a third configuration example of the antenna set. The antenna set 2C shown in FIG. 18 is attached to the window glass 120. The same points as the previously described antenna set will be omitted by referring to the previously described description.

An antenna set 2C includes a bracket 121C that supports the antennas 13 and 14 via the substrates 53 and 54. A bracket 121C includes a cover portion 179 that covers at least a part of the antennas 13, 14, a flange portion 179a that extends from both upper and lower ends of the cover portion 179, and a base portion 175 that forms a space between the base portion 175 and the cover portion 179. A bracket 121C is attached to the surface of the window glass 120 so that the antennas 13 and 14 are located in the space between the window glass 120 and the cover portion 179. A flange portion 179a is adhered to the surface of the window glass 120 by an adhesive member 178 such as glue or an adhesive tape.

An antenna set 2C is adhered to the surface of the window glass 120 by the adhesive member 178 at the flange portion 179a and the base portion 175 so that the base portion 175 is located between the antennas 13, 14 and the window glass 120. A base portion 175 is an example of a resin layer 72 of a single layer (that is, without an adhesive portion 74) previously described, and is a part of the bracket 121C. Since the base portion 175, which is a resin portion, is a part of the bracket 121C, not only transmission loss can be reduced but also the ease of attaching the antenna can be improved.

Although the antenna system has been described above according to the embodiment, the present disclosure is not limited to the above embodiment. Various modifications and improvements, such as combinations and substitutions with some or all of the other embodiments, are possible within the scope of the present disclosure.

For example, a glass plate is not limited to vehicles, but may be used for buildings or electronic devices. Furthermore, a glass plate is not limited to window glass, and the use of the glass plate may be other than the window glass.

What is claimed is:

1. An antenna system, comprising:
a glass plate with a thickness of 1.1 mm or more;
a resin layer in contact with one principal surface of the glass plate; and
an antenna located on an opposite side of the resin layer from a side where the glass plate is located, the antenna being spaced apart from the resin layer,
wherein a predetermined frequency of 3 GHz or greater is defined as F, a transmission coefficient S21 of the glass plate alone with respect to an incident electromagnetic wave of the frequency F is defined as $S21_G$ [dB], a transmission coefficient S21 of a laminate including the glass plate and the resin layer with respect to the incident electromagnetic wave of the frequency F is defined as $S21_{GR}$ [dB], a frequency closest to the frequency F among frequencies of incident electromagnetic waves at which the transmission coefficient S21 of the glass plate alone becomes a local maximum is defined as $F_P$, a transmission coefficient S21 of the glass plate alone with respect to an incident electromagnetic wave of the frequency $F_P$ is defined as $S21_{GP}$ [dB], a frequency closest to the frequency F among frequencies of incident electromagnetic waves at which the transmission coefficient S21 of the glass plate alone becomes a local minimum is defined as Fv, and a transmission coefficient S21 of the glass plate alone with respect to an incident electromagnetic wave of the frequency $F_V$ is defined as $S21_{GV}$ [dB],
wherein a thickness of the resin layer is configured such that:

$S21_{GR} - S21_G \geq (S21_{GP} - S21_{GV}) \times 0.2$, and wherein the antenna is supported by a bracket, and a material of the bracket includes a same material as in the resin layer.

2. The antenna system according to claim 1, wherein the resin layer includes a resin portion and an adhesive portion interposed between the one principal surface and the resin portion.

3. The antenna system according to claim 2, wherein the adhesive portion has a thickness of 0.1 mm or more and 2.0 mm or less.

4. The antenna system according to claim 2, wherein the resin portion has a relative permittivity of 1.5 or more and 10 or less.

5. The antenna system according to claim 2, wherein the resin portion has a thickness of 0.2 mm or more and 10 mm or less.

6. The antenna system according to claim 1, wherein the resin layer is formed of a single layer of resin.

7. The antenna system according to claim 1, wherein the glass plate has a dielectric loss tangent of 0.05 or less.

8. The antenna system according to claim 1, wherein the glass plate has a relative permittivity of 3 or more and 9 or less.

9. The antenna system according to claim 1, wherein the antenna is disposed at a distance of 0.5 mm or more and 10 mm or less from the resin layer.

10. The antenna system according to claim 1, wherein the bracket includes a portion including at least a part of the resin layer and a portion surrounding at least a part of the antenna.

11. The antenna system according to claim 1, wherein the frequency F is in a range of 5 to 6 GHz.

12. The antenna system according to claim 1, wherein the frequency F is in a range of 26 to 29 GHz.

13. The antenna system according to claim 1, wherein the frequency F is in a range of 38 to 40 GHz.

14. The antenna system according to claim 1, wherein the frequency F is in a range of 57 to 66 GHz.

15. The antenna system according to claim 1, wherein the frequency F is in the range of 76 to 81 GHz.

16. The antenna system according to claim 1, wherein a conditional expression below is satisfied:

$S21_G \leq -(S21_{GP} - S21_{GV}) \times 0.5$.

17. The antenna system according to claim 1, wherein an improvement amount represented by $(S21_{GR} - S21_G)$ is 0.50 dB or more.

18. The antenna system according to claim 1, wherein the glass plate is window glass.

19. The antenna system according to claim 18, wherein the window glass is window glass for a vehicle.

* * * * *